Patented Oct. 30, 1951

2,573,153

UNITED STATES PATENT OFFICE 2,573,153

RECOVERY OF NICKEL FROM NICKEL SILICATE ORE

Lyall J. Lichty, Ottawa, Ontario, Canada, assignor to Quebec Metallurgical Industries Limited, Toronto, Ontario, Canada, a corporation of Canada No Drawing. Application October 30, 1950, Serial No. 193,031

5 Claims. (Cl. 75—133.5)

The present invention relates to a method for recovering substantially all the nickel in the form of a high nickel content ferro-nickel alloy from nickel silicate ores containing a small amount of nickel and a relatively large amount of iron.

Nickel silicate ores are complex silicates the composition of which varies depending upon the location of the deposit from which they are obtained. In addition to nickel they usually contain a large amount of iron and either aluminum or magnesium or both in substantial amount. The nickel silicate mines of most commercial importance today are those of New Caledonia, the nickel mineral of which is garnierite. Its approximate analysis is 5 to 6 per cent nickel, 14 per cent $Fe_2O_3$, 15 per cent MgO, 48 per cent $SiO_2$ and 10 per cent combined water. The laterite ores, such as occur in Cuba, are lower in silica but higher in iron content. The term "silicate ore" as used herein is intended to include the laterite ores.

The conventional practice for recovery of nickel from high grade ore, such as the New Caledonia ore comprises first smelting in a blast furnace with gypsum to produce a nickel-iron matte with 30 to 45 per cent nickel. This is treated in a converter to remove iron and part of the sulphur leaving nickel sulphide. The converter slags are rich in nickel and must be resmelted. The nickel sulphide is roasted to produce oxide and the oxide may be reduced.

Low grade and medium nickel silicate ores contain less nickel and usually more iron. Due principally to the high ratio of iron to nickel in these ores, it has not been economical to process them by the conventional practice of smelting with gypsum and converting. So far as I am aware no satisfactory method has been proposed for the recovery of nickel in a commercial useable metallic form from low grade or medium grade nickel silicate ore.

The present invention is based upon discoveries made in smelting low and medium grade nickel silicate ores with a flux, such as lime, and an alloy of silicon, aluminum and iron as a reducing agent which is predominately silicon. In these ores the ratio of iron to nickel is greater than about 3.0 and the nickel content usually is between 1.5 to 3.0 per cent but may be as low as 0.75 per cent. I have discovered that as the amount of reducing agent used with a fixed amount of ore is diminished progressively below the amount theoretically required to reduce all the iron and nickel in the ore to metal, (1) a series of ferro-nickel alloys is obtained containing a progressively greater percentage of nickel and a progressively smaller percentage of iron; (2) in this series of alloys the amounts of nickel in those containing between about 30 to 60 per cent nickel by weight are substantially equal to the amount of nickel in the amount of ore treated, that is, the recovery of nickel is about 95 per cent; and (3) the alloys containing about 30 per cent or more are free of silicon. With some ores I have found that the percentage recovery of nickel begins to decrease as the amount of nickel in the ferro-nickel produced is increased over about 50 per cent and when the nickel content of the ferro-nickel is 60 per cent, the percentage nickel recovery is reduced to about 85 per cent.

The present invention involves smelting a low grade or medium grade nickel silicate ore with an amount of a reducing agent of the type specified herein selected to produce a ferro-nickel alloy containing more than about 30 per cent nickel and, preferably, not more than about 60 per cent nickel. While my investigations have been confined to the treatment of low or medium grade ore, I believe the invention is applicable to other nickel silicate ores in which the ratio of iron to nickel is substantially greater than that in the ferro-nickel alloy desired to be produced.

The advantages of the invention are two-fold. Thus, the invention (1) provides a method for the efficient recovery of the valuable nickel component from nickel silicate ores and (2) produces directly a high nickel content and high purity useful commercial product adapted for many uses previously requiring cathode nickel. In view of the small amount of reducing agent used with such a relatively large volume of ore containing a small amount of nickel and a relatively large amount of reducible iron compound which has a strong affinity for the reducing agent, it is surprising to discover that substantially all the nickel of the ore can be recovered in a high purity ferro-nickel containing more than 30 per cent nickel.

In the practice of the invention, I may employ as the reducing agent either silicon or ferrosilicon, aluminum or an alloy of silicon, aluminum and iron known as alsifier. I presently prefer to employ an alloy, a typical analysis of which is silicon 66.5 per cent, aluminum 8 per cent and iron 25 per cent, produced by reducing in an electric furnace a charge containing 6 to 20 per cent iron oxide, 3 to 25 per cent aluminum oxide, 40 to 55 per cent silica and carbon between 80 to 100 per cent of the amount theoretically required to reduce all the oxides in the charge to metal.

To obtain the advantageous results described above, it is necessary to employ the reducing agent in the form of a fine powder. I have found that the particle size of the reducing agent should not exceed about 65 mesh. It also is necessary to obtain an intimate mixture between the ore and the reducing agent. I have obtained most satisfactory results by intimately mixing the finely divided reducing agent with pulverized ore before they are introduced into the furnace. When reducing small batches of ore I have obtained best results employing an ore pulverized to about 10 mesh but when the ore is reduced in large batches it may be used in lumps up to one inch or more in size. I also intimately mix a flux, such as lime, with the ore to provide a fluid slag and to reduce the melting temperature of the charge, preferably, to between about 1400° C. and 1500° C. but a higher temperature may be used if desired. The mixture of pulverized ore, flux and finely divided reducing agent is placed in a suitable furnace, such as an oil fired furnace or an electric furnace of the electrode type, and melted. During melting the nickel component and a portion of the iron component of the ore are reduced to form a molten ferro-nickel alloy which sinks to the bottom of the furnace beneath a molten slag and may be tapped off.

In the practice of the invention I have found one pound of reducing agent containing about 25 per cent iron and the remainder essentially silicon or silicon and aluminum, will produce approximately three pounds of ferro-nickel alloy. In computing the amount of such reducing agent required to produce a ferro-nickel alloy containing more than 30 per cent of nickel or a desired amount of nickel between 30 and 60 per cent, it is practical and convenient to employ the formula $$\frac{100x}{3y}$$

where $x$ is the weight of nickel in the amount of ore being treated and $y$ is an integer not less than 30. In this formula the integer used corresponds to the desired per cent of nickel in the ferro-nickel alloy to be produced. Thus, if it is desired to produce a ferro-nickel alloy containing approximately 40 per cent nickel, the integer used is 40. If the amount of iron in the reducing agent used is substantially more or less than 25 per cent, the amount required, as computed by the above formula, should be increased 5 per cent for each 10 per cent variation in iron content of the reducing agent from 25 per cent.

In some instances, the nickel silicate ore may contain a small amount of a copper or a cobalt component or both. In such instances, the copper or cobalt component or both will be reduced and alloy with the ferro-nickel alloy produced. For most uses of the ferro-nickel alloy the presence of cobalt is not objectionable. The presence of copper in the product in the ratio of about one part to sixty parts of nickel is not objectionable.

In some instances, a small amount of sulfur component may be present in the ore and may be reduced and enter the alloy produced. In such event, the alloy can be desulfurized if desired by known methods.

The practice of the invention is illustrated further by the following specific examples of the treatment of ores obtained from different localities.

*Example 1*

Five hundred pounds of raw New Caledonia nickel silicate ore containing 2.27 per cent nickel, 14.11 per cent iron, 42.6 per cent silica, 19.02 per cent magnesia, 1.67 per cent alumina, 2.39 per cent lime, 0.83 per cent chromium, 0.17 per cent manganese, a trace of copper and with a substantial loss on ignition, was mixed with 80 pounds of lime and 8.9 pounds of reducing agent containing 66.5 per cent silicon, 8 per cent aluminum, 25 per cent iron and minor amounts of other metals. After melting the mixture at a temperature of approximately 1500° C., in a suitable furnace, and allowing the melt to settle, there was obtained 25.4 pounds of ferro-nickel containing 42.32 per cent nickel, 0.02 per cent carbon, 0.06 per cent copper, 0.035 per cent sulfur, 0.014 per cent phosphorus, a trace of silicon, a trace of manganese, a trace of chromium, and the balance iron. The recovery of nickel was about 96 per cent. In addition there was obtained a slag containing 0.08 per cent nickel and the remaining constituents of the original mixture.

*Example 2*

Four hundred pounds of Celebes nickel ore containing 2.38 per cent nickel, 0.04 per cent sulfur, 10.02 per cent iron, 42.24 per cent silica, 2.72 per cent alumina, 22.30 per cent magnesia, 0.62 per cent chromium, 0.13 per cent manganese and with a substantial loss on ignition was mixed with 120 pounds burnt lime and 7.5 pounds reducing agent containing 66.5 per cent silicon, 8 per cent aluminum, 25 per cent iron and minor amounts of other metals. After melting the mixture in a suitable furnace at a temperature of 1500° C., and allowing the melt to settle, there was obtained 22.6 pounds ferro-nickel containing 40.1 per cent nickel, 0.07 per cent copper, 0.145 per cent sulfur, 0.05 per cent carbon, 0.044 per cent phosphorus, 0.005 per cent chromium, a trace of silicon and manganese, and the balance iron. The recovery of nickel was about 95 per cent. In addition, there was obtained 564 pounds of slag containing 0.08 per cent nickel and the remaining non-volatile constituents of the original mixture.

*Example 3*

Four hundred pounds of Celebes nickel ore containing 2.38 per cent nickel, 0.04 per cent sulfur, 10.02 per cent iron, 42.24 per cent silica, 2.72 per cent alumina, 22.30 per cent magnesia, 0.62 per cent chromium, 0.13 per cent manganese and with a substantial loss on ignition, was mixed with 120 pounds of burnt lime and 5 pounds of reducing agent containing 66.5 per cent silicon, 8 per cent aluminum, 25 per cent iron, and minor amounts of other metals. After melting the mixture in suitable furnace at a temperature of about 1500° C., and allowing the melt to settle, there was obtained 13.1 pounds of ferro-nickel containing 61.33 per cent nickel, 0.03 per cent copper, 0.14 per cent sulfur, 0.03 per cent carbon, 0.02 per cent phosphorus, 0.005 per cent chromium and traces of silicon and manganese. The recovery of nickel was about 84 per cent. In addition there was obtained a slag containing 0.31 per cent nickel and the remaining non-volatile constituents of the original mixture.

I claim:

1. The method which comprises intimately mixing a pulverized nickel silicate ore with a flux and a reducing agent selected from the group consisting of aluminum, silicon, ferrosilicon and an alloy of silicon, aluminum and iron and having a particle size not greater than about 65 mesh, the ratio of iron to nickel in said ore being not less than about 3.0, the amount of reducing agent being substantially equal to $$\frac{100x}{3y}$$

plus 5 per cent thereof for each 10 per cent variation in iron content of the reducing agent from 25 per cent where $x$ is the weight of nickel in the amount of ore treated and $y$ is an integer between 30 and 60, thereafter supplying heat to melt the mixture whereby substantially all the nickel component and a portion only of the iron component of the ore are reduced to metal to form a molten ferro-nickel alloy containing not less than about 30 per cent nickel which settles beneath a molten slag, and separating the ferro-nickel alloy from the slag.

2. The method which comprises intimately mixing a pulverized nickel silicate ore with a reducing agent and flux, said reducing agent being an alloy of silicon, iron and aluminum and having a particle size not greater than about 65 mesh, the amount of reducing agent being substantially equal to $$\frac{100x}{3y}$$

plus 5 per cent thereof for each 10 per cent variations in iron content of the reducing agent from 25 per cent where $x$ is the weight of nickel in the amount of ore treated and $y$ is an integer between 30 and 60, the ratio of iron to nickel in said ore being not less than about 3.0, thereafter supplying heat to melt the mixture whereby substantially all the nickel component and a portion only of the iron component of the ore are reduced to metal to form a molten ferro-nickel alloy containing not less than about 30 per cent nickel which settles beneath a molten slag, and separating the ferro-nickel alloy from the slag.

3. The method which comprises mixing a pulverized nickel silicate ore with a flux to reduce the melting temperature of the ore, supplying heat to melt the mixture, intimately mixing with said mixture a reducing agent selected from the group consisting of silicon, aluminum, ferrosilicon and an alloy of silicon, aluminum and iron and having a particle size not greater than about 65 mesh, the ratio of iron to nickel in said ore being not less than about 3.0, the amount of reducing agent being substantially equal to $$\frac{100x}{3y}$$

plus 5 per cent thereof for each 10 per cent variation in iron content of the reducing agent from 25 per cent where $x$ is the weight of nickel in the amount of ore treated and $y$ is an integer between 30 to 60 whereby substantially all the nickel component and a portion only of the iron component of the ore are reduced to metal to form a molten ferro-nickel alloy containing not less than about 30 per cent nickel which settles beneath a molten slag, and separating the ferro-nickel alloy from the slag.

4. The method which comprises mixing a pulverized nickel silicate ore with a flux to reduce the melting temperature of the ore, supplying heat to melt the mixture, intimately mixing with said mixture a reducing agent consisting of an alloy of silicon, aluminum and iron and having a particle size not greater than about 65 mesh, the ratio of iron to nickel in said ore being not less than about 3.0, the amount of reducing agent being substantially equal to $$\frac{100x}{3y}$$

plus 5 per cent thereof for each 10 per cent variation in iron content of the reducing agent from 25 per cent where $x$ is the weight of nickel in the amount of ore treated and $y$ is an integer between 30 to 60 whereby substantially all the nickel component and a portion only of the iron component of the ore are reduced to metal to form a molten ferro-nickel alloy containing not less than about 30 per cent nickel which settles beneath a molten slag, and separating the ferro-nickel alloy from the slag.

5. The method which comprises mixing a pulverized nickel silicate ore with lime to reduce the melting temperature of the ore, supplying heat to melt the mixture, intimately mixing with said mixture a reducing agent selected from the group consisting of silicon, ferrosilicon, aluminum and an alloy of silicon, aluminum and iron and having a particle size not greater than about 65 mesh, the ratio of iron to nickel in said ore being not less than about 3.0, the amount of reducing agent being substantially equal to $$\frac{100x}{3y}$$

plus 5 per cent thereof for each 10 per cent variation in iron content of the reducing agent from 25 per cent where $x$ is the weight of nickel in the amount of ore treated and $y$ is an integer not less than 30 whereby the nickel and iron components of the ore are reduced to metal to form a molten ferro-nickel alloy containing more than about 30 per cent nickel which settles beneath a molten slag, and separating the ferro-nickel alloy from the slag.

LYALL J. LICHTY.

No references cited.